March 20, 1962  L. L. SILVEY  3,025,630
RODENT POISON CONTAINER AND FEEDER
Filed Dec. 21, 1959  2 Sheets-Sheet 1

Leonard L. Silvey
INVENTOR.

BY *Clarence A. O'Brien*
and *Harvey B. Jacobson*
Attorneys

March 20, 1962 L. L. SILVEY 3,025,630
RODENT POISON CONTAINER AND FEEDER
Filed Dec. 21, 1959 2 Sheets-Sheet 2
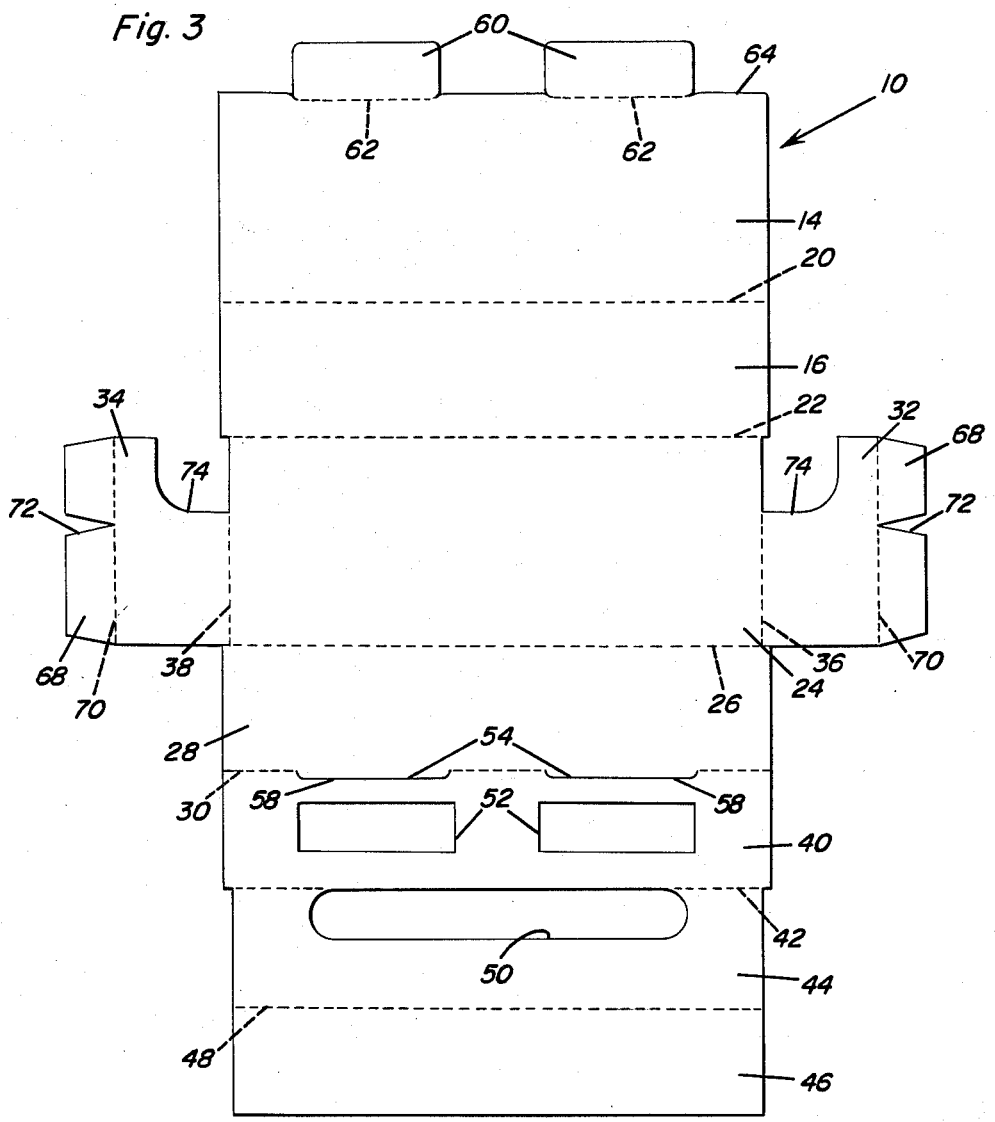
Fig. 3
Fig. 4
Leonard L. Silvey
INVENTOR.
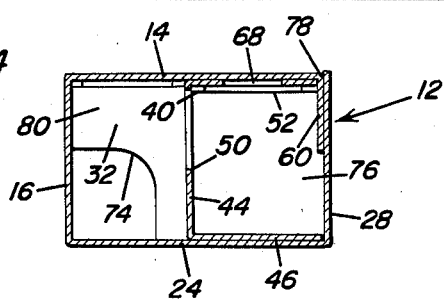

United States Patent Office 3,025,630
Patented Mar. 20, 1962

3,025,630
RODENT POISON CONTAINER AND FEEDER
Leonard L. Silvey, Kansas City, Kans.
(Chester Star Rte., Fairview, Okla.)
Filed Dec. 21, 1959, Ser. No. 861,047
9 Claims. (Cl. 43—131)

This invention relates to a novel and useful type of rodent poison container and feeder, and more particularly to a poison container which is specifically adapted for the storage of rodent poison and is provided with openings therein for permitting the ingress and egress of rodents, whereby the latter may eat a portion of the poison housed in the container which will subsequently prove to be fatal to the rodent.

In the past, many rodent exterminating devices have been designed to rid specified areas of unwanted rodents. Most of these have included the provision of a trap or the like which is specifically designed to catch the unwanted rodent and either kill it or detain it until the trap can be tended and the unwanted rodent can be otherwise exterminated. The present invention is not designed to detain or collect rodents necessitating that it must be tended from time to time to remove the unwanted rodents therefrom in order to prevent offensive odors or other undesirable consequences resulting from the detainment of the rodents, but provides a means whereby rodent poison may be displayed with a relatively high degree of safety in an area which is frequented by the unwanted rodents so that other animals and the like may not obtain access to the poison and rodents will be able to consume a portion thereof which will, subsequently and in a remote area, be fatal.

The main object of this invention is to provide a rodent poison container and feeder which is constructed in a manner to enable its placement in an area in which desirable animals or the like may have access to without danger of the desirable animals having access to the poison within the container.

A further object of this invention is to provide a device which is simple to use and which may be disposed of without considerable loss when its usefulness is terminated.

A further object of this invention is to provide a device that will be neat and unobtrusive in appearance as well as small in size.

Still another object is to provide a device which can be fabricated and shipped in a "knocked down" form and that will be capable of being assembled at its point of use and put into operation both readily and without inconvenience to the user.

A further object is to provide a device having a substantially enclosed poison compartment for the storage of the rodent poison therein contained within the feeder which is also provided with suitable openings and passageways to assist the rodents in their entry into the feeder to obtain the poison and their exit therefrom after having eaten a portion of the poison.

A final object to be specifically enumerated is to provide a device that will lend itself to conventional forms of manufacture and be extremely effective in the control of unwanted rodents so as to provide a device that will be economically feasible and useful in performing its desired function.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 3 is a top plan view of the blank which may be folded into the container and feeder construction illustrated in FIGURE 1; and FIGURE 4 is a transverse vertical sectional view taken substantially upon the plane indicated by the section line 4—4 of FIGURE 1.

Figure 1:
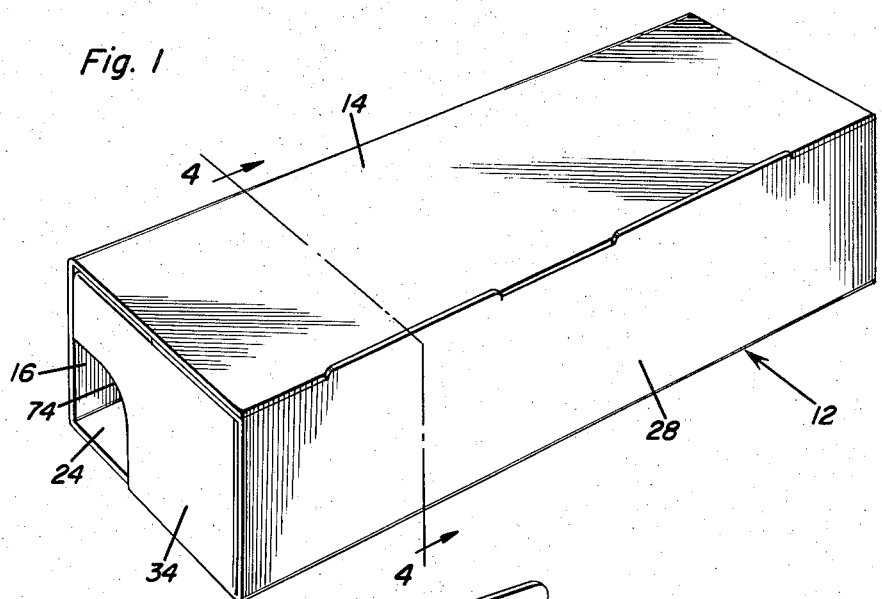
FIGURE 1 is an elevational view of the container and feeder comprising the instant invention.

Referring now more specifically to the drawings, the numeral 10 generally designates the blank panel which may be folded, as hereinafter set forth, to form the poison container and feeder generally designated by the reference numeral 12. The blank 10, with attention drawn more particularly to FIGURE 3 of the drawings, is in the form of a generally elongated and rectangular panel having a transversely extending top wall 14 on one end thereof. Formed adjacent the top wall 14 is a first side wall 16 defined by fold lines 20 and 22. Adjacent the first side wall 16 is formed a bottom wall 24 which terminates at fold line 26. The second side wall 28 is formed adjacent the bottom wall 24 remote from the first side wall 16 and terminates at fold line 30.

The above mentioned bottom, top and side walls may be positioned with respect to each other by folding along fold lines 20, 22, 26 and 30 to form the container and feeder 12 illustrated in FIGURE 1 which has its opposite ends partially closed by means of right and left end walls 32 and 34. The end walls 32 and 34 are each formed on an opposite end of the bottom wall 24 and the right end wall 32 is defined by the fold line 36, while the left end wall is defined by the fold line 38. Thus, the blank panel 10 may be folded into the container and feeder 12 illustrated in FIGURE 1 to provide a tubular construction in which rodents may enter and partake of the poison disposed therein. It is to be understood that the blank is held in its folded position by suitable locking tabs which are to be hereinafter more fully set forth.

Formed adjacent the second side wall 28 remote from the bottom wall 24 is an inner partial top wall 40 which terminates at fold line 42. The blank 10 extends beyond the inner partial top wall 40 and thereafter includes a partition wall 44 formed adjacent the inner partial top wall 40 remote from the second side wall 28 and an inner partial bottom wall 46 with fold line 48 extending between the last two mentioned walls.

It can be most clearly observed that a longitudinally extending cutout or access opening 50 is formed in the partition wall 44 immediately adjacent the fold line 42 and that the inner partial top wall 40 is provided with a pair of access openings 52.

Formed along the fold line 30 is a pair of shallow, U-shaped cuts 54 which have the ends of their leg portions terminating along the fold line 30 with the bight portions 58 projecting into the inner partial top wall 40.

The free side of the top wall 14 has projecting outwardly therefrom a pair of lock tabs 60 defined by fold lines 62 which are spaced slightly inwardly of the free side 64 of the top wall 14.

Each of the end walls 32 and 34 terminates along the side remote from the bottom wall 24 in a locking tab 68 which is defined by fold lines 70. Each of the locking tabs 68 has formed therein an outwardly opening V-shaped notch 72, the purpose of which is to be hereinafter more fully set forth.

It is to be noted (see FIGURE 1 in particular) that when assembled the container and feeder 12 has its side walls 16 and 28 disposed in parallel relation as well as the top and bottom walls 14 and 24, respectively. The side walls are disposed in perpendicular relation to the top and bottom walls. The end walls 32 and 34 are identical with the exception of being right handed and left handed and are each rectangular in outline and provided with an opening 74 in the corner thereof adjacent the bottom wall 24 and the first side wall 16. It will be noted that the openings 74 extend along the fold line 36 toward the second side wall 28 and that they extend outwardly from the end of the bottom wall 24 to a point spaced from the fold lines 70. It may thus be observed that when the end walls 32 and 34 are folded to a position perpendicular to the bottom wall 24 that the openings 74 will be aligned.

It will most clearly be observed from FIGURE 3 of the drawings that the top, inner partial top and side walls are all of equal length and that the bottom wall 24 and the partition wall and inner partial bottom wall 46 are of a length slightly shorter than the top and side walls for a purpose to be hereinafter more fully set forth.

Figure 2:
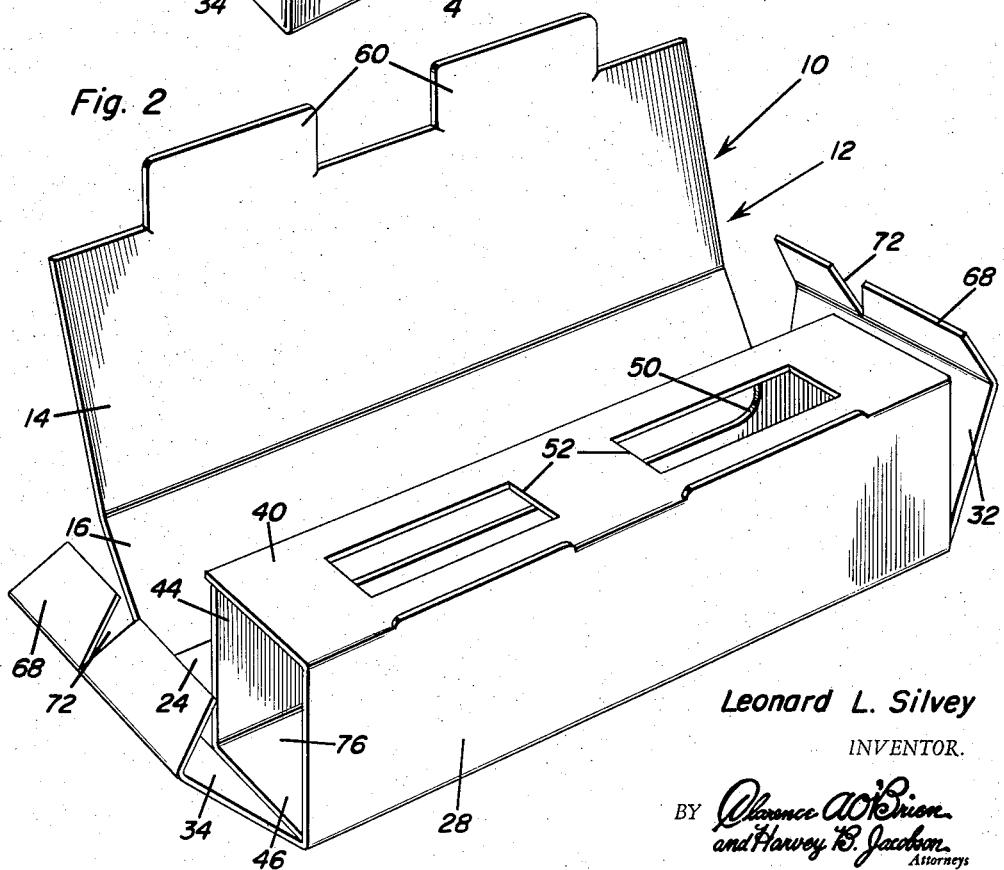
FIGURE 2 is a perspective view of the feeder and container similar to that of FIGURE 1 but with the container being shown in a partially unfolded state to illustrate the manner in which it may be assembled and to more clearly illustrate the structural details thereof.

With particular attention directed now to FIGURES 2 and 4 of the drawings, when assembling the container and feeder 12 the inner partial bottom wall 46 is first folded along the fold line 48 at right angles to the partition wall 44. The partition wall 44 is then folded along fold line 42 at right angles to the inner partial top wall 40, after which the latter is then folded along the fold line 30 at right angles to the second side wall 28. Thus, the last-mentioned four walls are disposed with adjacent walls at right angles to each other to form a poison reservoir compartment 76 bounded by the last-mentioned four walls. The first side wall 16 is then folded along fold line 22 at right angles to the bottom wall 24 and thereafter the top wall 14 is folded at right angles to the first side wall 16 along the fold line 20 to position the top wall to the bottom wall 24 and in overlying surface-to-surface, contacting relation with the inner partial top wall 40. It will be noted that the folding of the inner partial top wall 40 along fold line 30 enables the portion of the panel 10 defined by the U-shaped cuts 54 to remain in a plane defined by the second side wall 28, thereby forming a pair of openings or slots 78 for receiving the lock tabs 60 to retain the container and feeder 12 in its assembled state with the exception of the end walls 32 and 34. It will be noted that the inner partial top wall 40 and the inner partial bottom wall 46 are of equal width which enables the partition wall 44 to be disposed in perpendicular relation to the bottom wall 24 while the free edge of the inner partial bottom wall 46 abuts against the edge of the second side wall 28 adjacent the bottom wall 24 when the container 12 is assembled.

After the top wall 14 has been secured in overlying relation to the inner partial top wall 40 and the lock tabs 60 have been positioned within the openings or slots 78, the locking tabs 68 on the end walls 32 and 34 may be folded along the fold lines 70 and positioned beneath the top wall 14 and the inner partial top wall 40 as the end walls 32 and 34 are folded along fold lines 36 and 38 at right angles to the bottom wall 24 with the edge of the opposite ends of the partition wall 44 received in the V-shaped notches 72 formed in the locking tabs 68. In this manner, the top wall 14 comprises a means for biasing the inner partial top wall 40 into parallel relation with the bottom wall 24 which in turn insures a tight fit of the partition wall 44 between the top wall 14 and the bottom wall 24 and also insures that the free side edge of the inner partial bottom wall 46 abuts against the second side wall 28 adjacent the bottom wall 24 to maintain the partition wall 44 in perpendicular relation to the top and bottom walls 14 and 24.

It will be noted that the positioning of the top wall 14 in overlying relation to the inner partial top wall 40 also defines between the top and bottom walls 14 and 24 and the first side wall 16 and the partition wall 44 a rodent compartment 80 into which access may be gained through either of the openings 74. After a rodent has entered the compartment 80, poison may be obtained through the cutout or access opening 50 formed in the partition wall 44.

It is to be noted that the lock tabs 60 are not of the type that would restrict their withdrawal from the openings 78 after once having been positioned therethrough, which affords a means whereby the supply of poison within the poison reservoir compartment 76 may be replenished by removing the locking tabs 68 and lifting the top wall 14 from overlying relation with the inner partial top wall 40 to provide access to the access openings 54 through which the supply of poison within the poison reservoir 76 may be replenished.

It is to be understood that any convenient material may be utilized to form the container and feeder 12, such as sheet cardboard, metal or other suitable material, and also that, if it is desired, the container and feeder 12 may be formed of rigid construction, in which case the access openings 52 may be omitted together with the inner partial top and bottom walls 40 and 46. If the container 12 is to be of a rigid construction, the supply of poison within the poison reservoir compartment 76 may then be replenished through either of the openings 74 and the adjacent portion of the access opening 50.

Further, if it is desired, the portions of locking tabs 68 underlying the inner partial top wall 40 may be glued thereto during the assembly of the container 12 to insure that the poison reservoir 76 will remain in an assembled state even when the top wall 14 is not secured in surface-to-surface contacting relation to the inner partial top wall 40, as when the top wall 40 is folded back to enable the poison to be inserted into the reservoir 76 through access openings 52. Also, the container and feeder 12 may be constructed in any size desired and with the size of the various compartments in any ratio relative to the other compartment.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rodent poison container and feeder comprising an elongated blank having a top wall extending transversely across one end thereof, a first transversely extending side wall adjacent said top wall, a fold line extending between said top and first side walls, a transversely extending bottom wall adjacent said first side wall remote from said top wall, a fold line extending between said bottom and first side walls, a transversely extending second side wall adjacent said bottom wall remote from said first side wall, a fold line extending between said bottom and second side walls, a transversely extending inner partial top wall adjacent said second side wall remote from said bottom wall, a fold line extending between said second side and inner partial top walls, a transversely extending partition wall adjacent said inner partial wall remote from said second side wall, a fold line extending between said partition and inner partial top walls, a transversely extending inner partial bottom wall adjacent said partition wall remote from said partial top wall, a fold line extending between said partition and inner partial bottom walls, a pair of rectangular end walls on opposite ends of said bottom wall, fold lines extending between the ends of said bottom wall and said end walls, at least one of said end walls having an opening formed therein in the corner adjacent said bottom and first side walls, said partition wall having a longitudinally extending cutout formed therein adjacent said inner partial top wall, each of said end walls terminating in a locking tab having a dividing notch formed therein for receiving a portion of the corresponding end of the partition wall, said inner partial top wall having at least one slot formed therein adjacent said second side wall, the side top wall remote from said first side wall having a laterally projecting lock tab formed thereon receivable in said slot.

2. The combination of claim 1 wherein said slot comprises a U-shaped cut formed through said top wall, with the legs of said cut extending to the fold line between said top wall and said second side wall whereby when said panel is folded along said last-mentioned fold line the portion of said inner partial top wall defined by said U-shaped cut will remain in the same plane with said second side wall and thereby form an elongated slot in said inner partial top wall.

3. The combination of claim 1 wherein said inner partial top wall has at least one access opening formed therein.

4. The combination of claim 1 wherein said top and bottom walls are equal in width and are wider than said inner partial top wall, said opening extending along the edge of said bottom wall from said first side wall toward said second side wall a distance no more than the difference between the widths of said bottom and inner partial top walls.

5. A rodent poison container having interconnected bottom, top, side and end walls positioned relative to each other to form a tubular housing or container, a partition wall secured in said container and extending between said top and bottom walls forming a poison reservoir compartment and a rodent compartment in said container, the upper portion of said partition wall having an access opening formed therein extending longitudinally thereof, said end walls having entrance and exit openings formed therein adjacent said bottom wall and the side wall remote from said poison compartment to permit the ingress and egress of rodents relative to said rodent compartment, said container being formed from a single panel with fold lines between adjacent panels, said partition wall being secured to the other side wall by means of an inner partial top wall underlying said top wall in surface-to-surface contacting relation therewith, an inner partial bottom wall adjacent said partition wall remote from said inner partial top wall overlying said bottom wall in surface-to-surface contacting relation therewith and with the free edge thereof abutting against said other side wall, said end walls projecting from the free ends of said bottom walls and each terminating in a locking tab having a dividing notch formed therein for receiving the corresponding free end of said partition wall adjacent said inner partial top wall, said top wall having at least one slot formed therein adjacent said other side wall, said top wall having on its free side a lock tab receivable in said slot.

6. The combination of claim 5 wherein said inner partial top wall has at least one access opening formed therein.

7. The combination of claim 5 wherein said entrance and exit openings are aligned to define a straight through passage in said rodent compartment, said partition wall forming one side of said passage.

8. A rodent poison container having interconnected bottom, top, side and end walls positioned relative to each other to form a tubular housing or container, a partition wall secured in said container and extending between said top and bottom walls forming a poison reservoir compartment and a rodent compartment in said container, the upper portion of said partition wall having an access opening formed therein extending longitudinally of said partition wall, said end walls having entrance and exit openings formed therein adjacent said bottom wall and said side wall remote from said poison compartment to permit the ingress and egress of rodents relative to said rodent compartment, said container being formed of a single panel with fold lines between adjacent panels, said partition wall being secured to the other side wall by means of an inner partial top wall underlying said top wall in surface-to-surface contacting relation therewith.

9. The combination of claim 8 including an inner partial bottom wall carried by said partition wall remote from said inner partial top wall overlying said bottom wall in surface-to-surface contacting relation therewith and with the free edge thereof remote from said partition wall abutting against said other side wall.

References Cited in the file of this patent

UNITED STATES PATENTS

| | | |
|---|---|---|
| 794,323 | Small | July 11, 1905 |
| 1,309,606 | Bartholomew | July 15, 1919 |
| 2,912,788 | Hargrove | Nov. 17, 1959 |
| 2,944,364 | Kelly | July 12, 1960 |